US006818283B2

(12) United States Patent
Nakamura et al.

(10) Patent No.: US 6,818,283 B2
(45) Date of Patent: Nov. 16, 2004

(54) IMAGE-RECEIVING SHEET FOR ELECTROPHOTOGRAPHY

(75) Inventors: Yoshisada Nakamura, Fujinomiya (JP); Ashita Murai, Fujinomiya (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/176,082

(22) Filed: Jun. 21, 2002

(65) Prior Publication Data

US 2003/0082354 A1 May 1, 2003

(30) Foreign Application Priority Data

Jun. 22, 2001 (JP) ....................................... 2001-189827

(51) Int. Cl.[7] ............................ B32B 27/14; B32B 3/00

(52) U.S. Cl. .................... 428/206; 428/195.1; 428/338; 427/121; 430/124

(58) Field of Search .............................. 428/195.1, 206, 428/338, 195; 430/124; 427/121

(56) References Cited

U.S. PATENT DOCUMENTS 4,418,942 A * 12/1983 Hosoi et al. ............... 282/27.5
4,508,751 A * 4/1985 Tamagawa et al. ........... 427/44
5,035,993 A * 7/1991 Hirano et al. ............... 430/598
5,474,856 A * 12/1995 Tamagawa et al. ...... 428/537.5
5,691,039 A * 11/1997 Rimai et al. ............. 428/195.1
6,233,424 B1 * 5/2001 Mohri et al. ................ 399/320
6,387,478 B2 * 5/2002 Fujimoto .................... 428/215
6,544,709 B1 * 4/2003 Wang et al. ................ 430/124
2003/0096130 A1 * 5/2003 Kegasawa et al. .......... 428/513
2004/0005421 A1 * 1/2004 Gervasi et al. ............ 428/35.7

* cited by examiner

*Primary Examiner*—B. Shewareged
(74) *Attorney, Agent, or Firm*—Young & Thompson

(57) ABSTRACT

Image-receiving sheets for electrophotography are provided, which are excellent in anti-curling property and anti-cracking property of the image surface thereof and which can be easily produced. The image-receiving sheets include a base paper and a toner image-receiving layer made of a thermoplastic resin on at least one surface of the base paper. The toner image-receiving layer contains less than 40% by mass of a pigment, based on the thermoplastic resin. The thermoplastic resin infiltrates into a depth of 1 to 50% of the thickness of the base paper from the surface of the base paper at the toner image-receiving layer side.

6 Claims, 1 Drawing Sheet

IMAGE-RECEIVING SHEET FOR ELECTROPHOTOGRAPHY

BACKGROUND OF THE INVENTION

The present invention relates to an image-receiving sheet for electrophotography. In particular, the present invention relates to a high-quality image-receiving sheet for electrophotography, which is particularly used for machines for an electrophotographic process such as copying machines, printers and facsimiles, for example, color copying machines, to provide photo-images having high quality and gloss.

The offset printing technique is mainly employed in general commercial printing and high-quality printing methods. For the offset printing, coated papers such as art papers are used, because these papers have a very smooth surface and accordingly have merits such as an excellent ink transition, a high image reproducibility, a high image gloss and a good color reproducibility.

However, the coating layer of the coated paper containing a large amount of a pigment has a high hygroscopicity. Therefore, when the coated paper per se is used as the image-receiving sheet for electrophotography, water vapor in the coated paper expands when the image is fixed by heating and, as a result, blisters (expansions in the coated layer) are formed to cause rough or coarse image and to make the formation of a fine image like a photograph impossible. Another problem of the ordinary coated papers is that when an image information such as a face or scenery is to be output as a photograph, the gloss is not enough. Under these circumstances, the coated papers have rarely been used as the image-receiving sheets for electrophotography.

SUMMARY OF THE INVENTION

Figure 1:
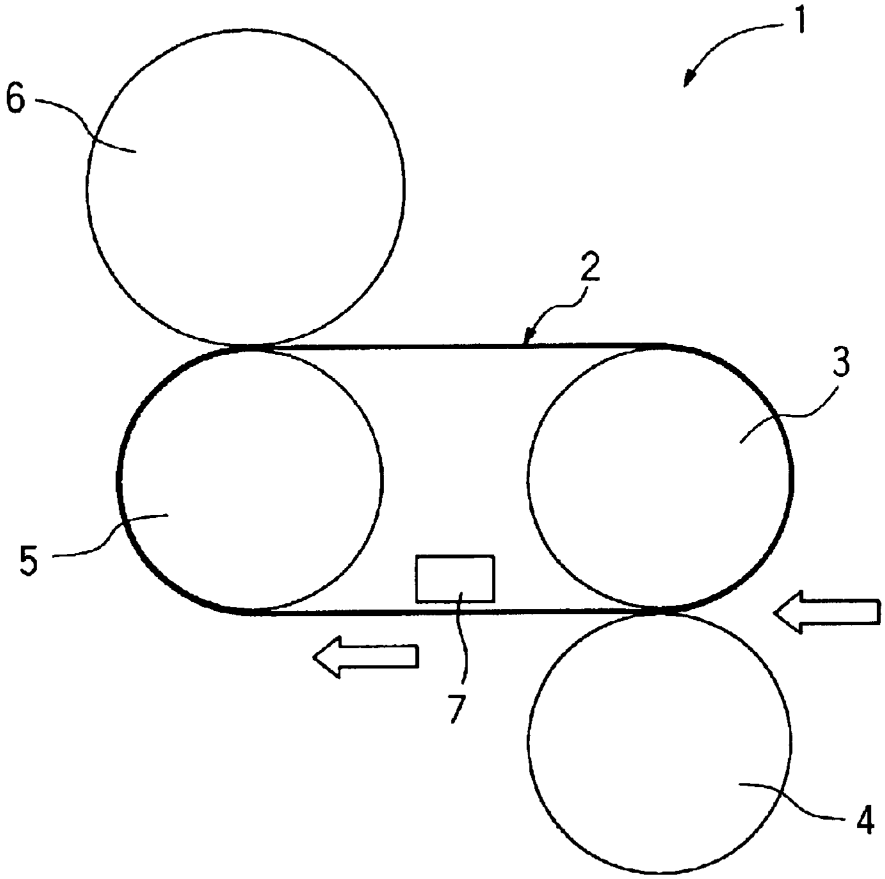
FIG. 1 is a schematic diagram showing a fixing belt system in a printer used in Examples.

The inventors have found that image-receiving sheets for electrophotography, comprising (1) a base paper and (2) a toner image-receiving layer formed thereon and having an excellent property of preventing the curling and only a slight cracking property of the image surface, can be easily obtained by using as small as possible amount of a pigment in the toner image-receiving layer and making a thermoplastic resin constituting the toner image-receiving layer to infiltrate into the base paper to a predetermined depth. The present invention has been completed on the basis of this finding.

Namely, the present invention relates to an image-receiving sheet for electrophotography, which comprises (1) a base paper and (2) a toner image-receiving layer comprising a thermoplastic resin formed on at least one surface of the base paper, wherein the toner image-receiving layer contains less than 40% by mass, based on the thermoplastic resin, of a pigment and the thermoplastic resin is infiltrated to a depth of 1 to 50% of the thickness of the base paper from the surface thereof at the image-receiving layer side.

Japanese Patent Unexamined Published Application (hereinafter referred to as "J. P. KOKAI") No. Hei 5-241366 discloses a coated paper usable as an image-receiving sheet for electrophotography. However, the base paper used therein has a recording layer (toner image-receiving layer), containing 76 to 95% by mass of a pigment, formed thereon (paragraph (0014)). Therefore, this image-receiving sheet has problems such as the streak caused by the use of the pigment-containing coating layer. For this reason, the problem is solved in this specification by limiting the Oken-shiki smoothness of the base paper to 200 seconds or shorter. Further, this Kokai patent application is completely silent on the infiltration of the thermoplastic resin for forming the toner image-receiving layer to a predetermined depth of the support and also on the fact that the curling and cracking can be prevented.

Also J. P. KOKAI No. Hei 2000-235276 discloses a thick recording sheet for electrophotography, which has an Oken-shiki smoothness of 70 to 200 seconds. However, this Patent Gazette is utterly silent on the infiltration of the thermoplastic resin constituting the toner image-receiving layer into a predetermined depth of the base paper and also on the fact that the curling and cracking can be prevented.

On the other hand, J. P. KOKAI No. Hei 5-173352 discloses image-receiving sheets for electrophotography produced by using a specified sizing agent to set the degree of the sizing (Stoekight sizing degree) of a base paper in a predetermined range. However, this Patent Gazette is utterly silent on the infiltration of the thermoplastic resin constituting the toner image-receiving layer into a predetermined depth of the base paper and also on the fact that the curling and cracking can be prevented.

DESCRIPTION OF THE PREFERRED EMBODIMENTS

The detailed description will be made on the present invention below.

Base Paper

The base papers usable for forming the photographic image-receiving sheets of the present invention are raw papers. Pulps usable as the materials for the raw papers are desirably bleached kraft pulps of broadleaf trees (LBKP), because they are capable of improving all of the surface smoothness, rigidity and dimensional stability (curling property) of the raw paper to desirable levels while keeping these properties well-balanced. Further, bleached kraft pulps of needle-leaf trees (NBKP) and sulfite pulps of broad leaf trees (LBSP) are also usable.

Preferably, pulps of broad leaf trees originally having short fibers are mainly used as the pulp fibers.

For beating the pulps, beaters, refiners, etc. can be used. If necessary, various additives such as fillers, dry strength additives, sizing agents, wet strength additives, fixing agents and pH regulators are added to a pulp slurry (hereinafter referred to as "pulp stock") obtained after the beating of the pulp.

The fillers include, for example, calcium carbonate, clay, kaolin, china clay, talc, titanium oxide, diatomaceous earth, barium sulfate, aluminum hydroxide and magnesium hydroxide.

The dry strength additives include, for example, cationized starch, cationized polyacrylamide, anionized polyacrylamide, amphoteric polyacrylamide and carboxy-modified polyvinyl alcohol.

The sizing agents include, for example, fatty acid salts, rosin, rosin derivatives such as maleinized rosin, paraffin wax, and compounds containing higher fatty acids such as alkylketene dimers (AKD), alkenyl succinic anhydride (ASA) and epoxidized fatty acid amides (EFA).

The wet strength additives include, for example, polyamine polyamide epichlorohydrin, melamine resin, urea resin and epoxidized polyamide resin.

The fixing agents include, for example, polyvalent metal salts such as aluminum sulfate and aluminum chloride, and cationic polymers such as cationized starch.

The pH regulators include, for example, sodium hydroxide and sodium carbonate.

Other additives are, for example, defoaming agents, dyes, slime controlling agents and fluorescent brightening agents. If necessary, a softening agent or the like can also be used. The softening agents are described in, for example, *Shin-Kami Kako Benran* (edited by Shiyaku Time Co.) (pages 554 to 555) (published in 1980).

Processing solutions used for the surface sizing treatment may contain, for example, a water-soluble high-molecular substance, a sizing agent, a water-resistant substance, a pigment, a pH regulator, a dye, a fluorescent brightening agent or the like. The water-soluble high-molecular substances include, for example, cationized starch, polyvinyl alcohol, carboxy-modified polyvinyl alcohol, carboxymethylcellulose, hydroxyethylcellulose, cellulose sulfate, gelatin, casein, polysodium acrylate, sodium salt of styrene/maleic anhydride copolymer and polysodium styrenesulfonate.

The water-resistant substances include, for example, latex emulsions of styrene/butadiene copolymer, ethylene/vinyl acetate copolymer, polyethylene and vinylidene chloride copolymers: and polyamide polyamine epichlorohydrin.

The pigments include, for example, calcium carbonate, clay, kaolin, talc, barium sulfate and titanium oxide.

The materials for the raw papers include synthetic pulp papers, mixed papers of a natural pulp and a synthetic pulp, and various combined papers in addition to the above-described natural pulp papers.

The thickness of the base paper, is usually 30 to 500 $\mu$m, preferably 50 to 300 $\mu$m and more preferably 100 to 200 $\mu$m.

For improving the rigidity and dimensional stability (curling property) of the electrophotographic image-receiving sheet, the ratio (Ea/Eb) of the longitudinal Young's modulus (Ea) to the transverse Young's modulus (Eb) is preferably in the range of 1.5 to 2.0. When Ea/Eb value is below 1.5 or above 2.0, the rigidity and curling property of the electrophotographic image-receiving sheet are inclined to be poor to cause troubles in the running property in the carrying step.

In the present invention, the Oken-shiki smoothness of the surface of the toner image-receiving layer side of the base paper is at least 210 seconds, preferably at least 250 seconds. When the Oken-shiki smoothness is less than 210 seconds, the quality of the toner image is unfavorably low. Although the upper limit of the Oken-shiki smoothness is not particularly provided, it is actually about 600 seconds, preferably about 500 seconds.

The Oken-shiki smoothness is the smoothness determined by JAPAN TAPPI No. 5 B method.

Once the present invention is published, it will become easy to control the Oken-shiki smoothness at such a relatively high level. For example, the Oken-shiki smoothness can be controlled at 210 seconds or higher by one of the following methods or a combination of them:

(1) Control of the Beating Conditions

The beating conditions are controlled to obtain the pulp fiber length after the beating of, for example, 0.40 to 0.70 mm, preferably 0.50 to 0.65 mm.

(2) Calender Treatment of the Surface

The surface of the base paper is subjected to the calender treatment to make the density of the base paper high. For example, the density of the base paper is preferably 0.80 to 1.15 g/cm$^2$, more preferably 0.90 to 1.10 g/cm$^2$.

For efficiently increasing the smoothness of the surface, the calender treatment temperature (the temperature of the roll of the calender) is controlled at 90 to 160° C., preferably 110 to 160° C.

The Stoekight sizing degree of the base paper surface is at least 100 seconds, preferably at least 150 seconds in the present invention. By controlling the Stoekight sizing degree at such a relatively high degree, the image quality and gloss can be improved.

The Stoekight sizing degree is a sizing degree determined by JIS P 8122. Concretely, the Stoekight sizing degree is determined by floating a piece of a sample on a 2% ammonium thiocyanate solution, immediately adding one drop of 1% ferric chloride solution on the sample and measuring the time (seconds) required for the appearance of a red spot on the sample. The longer the time, the higher the sizing property for inhibiting the infiltration of the solution.

Once the present invention is disclosed, it will become easy for those skilled in the art to easily obtain such a relatively high Stoekight sizing degree. For example, a Stoekight sizing degree of 100 seconds or above can be attained by one of the following methods or a combination of them.

(1) Control of Sizing Agent

For example, the sizing agent is used in an amount of 0.2 to 2.0% by mass, preferably 0.3 to 1.5% by mass, based on the pulp. By thus controlling the amount of the sizing agent, the wetting property of the base paper can be remarkably reduced.

Preferably, compounds containing a higher fatty acid such as an alkyl ketene dimer (AKD), an alkenyl succinic acid anhydride (ASA) or an epoxidized fatty acid amide (EFA) are used.

(2) Control of Porosity of the Base Paper

The density of the base paper is controlled at 0.8 g/cm$^3$ or higher, preferably 0.85 g/cm$^3$ or higher by the calender treatment in the same manner as that in the control of the Oken-shiki smoothness. The upper limit of the porosity will be, for example, about 1.15 g/cm$^3$.

In general, it has been known that the toughness of papers is variable depending on the beating method. The elasticity (modulus of elasticity) of the paper obtained after the beating can be employed as an important factor of showing the degree of the toughness. In particular, the modulus of elasticity of the paper can be determined according to the following formula by determining the sound velocity in the paper with an ultrasonic oscillation element according to the relationship between the dynamic modulus and density, which show the physical properties of the viscoelastomer, of the paper:

$$E=\rho c^2(1-\nu^2)$$

wherein E represents the dynamic modulus, ρ represents the density, c represents the sound velocity in the paper and ν represents Poisson's ratio.

Because ordinal paper sheets have ν of about 0.2, the dynamic modulus can also be calculated according to the following formula without a significant difference:

$$E=\rho c^2$$

Namely, the modulus of elasticity can be easily determined when the density of the paper and the sound velocity can be obtained. For determining the sound velocity in the above formula, various known devices such as Sonic Tester SST-110 (a product of Nomura Shoji K.K.) can be used.

The basis weight of the base paper is in the range of, for example, 50 to 250 g/m$^2$, preferably 100 to 180 g/m$^2$.

Preferred examples of the base papers include wood free papers and papers described in, for example "Shashin Kogaku no Kiso (Fundamentals of Photographic Engineering) -Gin'en Shashin-Hen (Edition of Silver salt Photos)-" (edited by Nippon Shashin Gakkai and published by Corona Co., Ltd. in 1979), pages 223 to 240.

Infiltrated Part of the Base Paper

A thermoplastic resin for forming the toner image-receiving layer which will be described below is infiltrated into the base paper used in the present invention, to a depth of 1 to 50%, preferably 1 to 10%, of the thickness of the base paper. By the infiltration to the depth in this range, the cracking of an image to be formed in the toner image-receiving layer and also the curling of the sheet can be further prevented.

The infiltrated part can be formed by, for example, using a coating liquid for forming the toner image-receiving layer in such a manner that the coating liquid is infiltrated into the base paper in the thickness direction through the base paper surface. In this case, the thermoplastic resin constituting the toner image-receiving layer may have a concentration gradient along the depth in the base paper or it may be in a certain uniform or ununiform state.

In an example of methods for the infiltration of the thermoplastic resin to such a given depth, a coating liquid for forming the toner image-receiving layer is applied to the surface of the base paper and then it is dried. In this method, the characteristic properties of the coating liquid must be taken into consideration depending on the depth of the infiltration of the thermoplastic resin layer. However, once the present invention is disclosed, it will become self-evident for those skilled in the art to infiltrate the thermoplastic resin to a predetermined depth, and some variations thereof are possible.

It is considered that there can be various factors which influence the infiltration depth. They are, for example, the viscosity of the coating liquid, the surface tension, drying time and calender treatment conditions. By discussing those factors, it is made possible to infiltrate the thermoplastic resin to a desired depth in the direction of the thickness of the base paper.

The viscosity of the coating liquid is, for example, at least 10 mPa·s, preferably at least 30 mPa·s. The upper limit of the viscosity is actually about 300 mPa·s, preferably about 150 mPa·s. By lowering the viscosity of the coating liquid, the thermoplastic resin can be more deeply infiltrated into the base paper.

The surface tension of the coating liquid is, for example, not higher than 50 mN/m, preferably not higher than 40 mN/m. The lower limit of the surface tension thereof is actually, for example, 20 mN/m, preferably 25 mN/m. For deeply infiltrating the thermoplastic resin into the base paper, the surface tension of the coating liquid is reduced.

The coating liquid is dried within 2 minutes, preferably within 1 minute and more preferably within 30 seconds after the application thereof. By drying the coating liquid in a shorter time within 2 minutes, the infiltration depth thereof can be kept low. The drying is completed when, for example, the temperature of the coating surface becomes equal to the wet-bulb temperature in the dry atmosphere.

The calender treatment is preferably conducted after the application of the coating liquid and drying. The pressure in the calender treatment is, for example, at least 98 N/cm (10 Kgf/cm), preferably at least 294 N/cm (30 Kgf/cm). The upper limit of the pressure might be, for example, 3923 N/cm (400 Kgf/cm), preferably 981 N/cm (100 Kgf/cm). The higher the pressure, the deeper the infiltration.

The temperature in the calender treatment is not higher than 120° C., preferably not higher than 90° C. The lower limit of the temperature is, for example, in the range of room temperature to about 40° C., taking the problem of the adhesion to the roll or belt used in the fixing treatment into consideration. The lower the calender treatment temperature, the deeper the infiltration of the thermoplastic resin.

Toner Image-Receiving Layer

The toner image-receiving layer is provided on at least one surface of the base paper in the present invention. The toner image-receiving layer can contain a pigment in an amount of less than 40% by mass, preferably less than 30% by mass and particularly preferably less than 20% by mass based on the thermoplastic resin constituting the toner image-receiving layer. As the relative amount of the pigment is increased, blisters become to be easily formed to make the obtained toner image rough.

In the present invention, the toner image-receiving layer is preferably formed by using the coating liquid as described above. By using the coating liquid, the electrophotographic image-receiving sheets can be relatively easily produced and the infiltration to the thickness direction in the base paper is made possible.

By applying the coating solution, the toner image-receiving layer is formed on the surface of the base paper and, at the same time, the thermoplastic resin can be infiltrated in the thickness direction into the base paper. By the infiltration of the thermoplastic resin into a predetermined depth in the base paper, the dependency of the base paper and the toner image-receiving layer on heat is improved, the cracking of the toner image-receiving layer can be prevented and the curling resistance of the electrophotographic image-receiving sheet can be improved. Further, when the coating liquid infiltrates in a large amount, the hygroscopicity of the base paper itself is lowered and, therefore, the elongation of the base paper due to the water absorption thereof is reduced and the anti-curl property is also improved. Particularly when a back layer or a toner image-receiving layer and the infiltration portion are formed also on the back surface of the base paper by using the thermoplastic resin used for forming the toner image-receiving layer on the surface of the base paper, the anti-curl property is remarkably improved.

The toner image-receiving layer used in the present invention has functions of receiving an image-forming toner from a developing drum or an intermediate transfer medium by (static) electricity, pressure, etc. in the transferring step and fixing the image by heat, pressure, etc. in the fixing step.

The toner image-receiving layer used in the present invention can contain various additives in addition to the thermoplastic resin so far as the additives do not impair the function of the toner image-receiving layer.

The thickness of the toner image-receiving layer is at least a half, preferably 1 to 3 times as much as the particle diameter of the toner used. The thickness of the toner image-receiving layer is preferably as described in J. P. KOKAI Nos. Hei 5-216,322 and 7-301,939. Concretely, the thickness is, for example, 1 to 50 $\mu$m, preferably 5 to 15 $\mu$m.

The toner image-receiving layer preferably has one, more preferably two or more and most preferably all of the following physical properties:

(1) The toner image-receiving layer has a Tg (glass transition temperature) in the range of 30° C. to toner Tg+20° C.

(2) The toner image-receiving layer has T1/2 (1/2 method softening point) of 60 to 200° C., preferably 80 to 170° C.

The 1/2 method softening point is defined to be a temperature at which the difference between piston stroke at the initiation of the flowing and that at the end of the flowing is 1/2, when heat increase is caused at a prescribed constant rate using a prescribed device and condition while a prescribed extrusion pressure is imposed, after a thermal inertia time of, for example, 300 sec. at an initial set temperature (for example, 50° C.).

(3) Tfb (temperature at which the flowing begins) of the toner image-receiving layer is 40 to 200° C. Preferably Tfb of the toner image-receiving layer is not higher than toner Tfb+50° C.

(4) Temperature at which the viscosity of the toner image-receiving layer is $1\times10^5$ CP is not lower than 40° C. and lower than that of the toner.

(5) The storage elastic modulus (G') at a fixing temperature of the toner image-receiving layer is $1\times10^2$ to $1\times10^5$ Pa and the loss elastic modulus (G") thereof is $1\times10^2$ to $1\times10^5$ Pa.

(6) The loss tangent (G"/G'), which is the ratio of the loss elastic modulus (G") to the storage elastic modulus (G') at a fixing temperature of the toner image-receiving layer, is 0.01 to 10.

(7) The storage elastic modulus (G') at a fixing temperature of the toner image-receiving layer is −50 to +2500 as compared with the storage elastic modulus (G") at the fixing temperature of the toner.

(8) The inclination on the image-receiving layer of the molten toner is not higher than 50°, particularly not higher than 40°.

The toner image-receiving layers are preferably those satisfying physical properties described in Japanese Patent No. 2,788,358 and J. P. KOKAI Nos. Hei 7-248,637, Hei 8-305,067 and Hei 10-239,889.

The physical property of above item (1) can be determined with a differential scanning calorimeter (DSC). The physical properties of above items (2) to (4) can be determined with, for example, Flow Tester CFT-500 or 500D (Shimadzu Corporation). The physical properties of above items (5) to (7) can be determined with a rotary rheometer (such as Dinamic Analyzer RADII of Rheometric Co.). The physical property of above item (8) can be determined by a method described in J. P. KOKAI No. Hei 8-334,916 with a contact angle meter of Kyowa Kaimen Kagaku K.K.

The thermoplastic resins usable for the toner image-receiving layer of the present invention are not particularly limited so far as they are capable of being deformed at the fixing temperature and also capable of receiving the toner. The thermoplastic resin used for the toner image-receiving layer preferably belongs to the same group as that of a resin used as the binder for the toner. Because polyester resins, styrene/acrylic acid ester copolymers, styrene/methacrylic acid ester copolymers, etc. are used for forming the toner in many cases, the thermoplastic resins used for the toner image-receiving layer in the present invention are preferably polyester resins, styrene/acrylic acid ester copolymers, styrene/methacrylic acid ester copolymers, etc.

Examples of the thermoplastic resins are as follows:

(A) Thermoplastic resins having an ester linkage

Polyester resins obtained by the condensation of a dicarboxylic acid component such as terephthalic acid, isophthalic acid, maleic acid, fumaric acid, phthalic acid, adipic acid, sebacic acid, azelaic acid, abietic acid, succinic acid, trimellitic acid or pyromellitic acid (such a dicarboxylic acid component may be substituted with a sulfonic acid group, carboxyl group or the like) with an alcohol component such as ethylene glycol, diethylene glycol, propylene glycol, bisphenol A, a diether derivative of bisphenol A (such as 2 ethylene oxide adduct of bisphenol A or 2 propylene oxide adduct of bisphenol A), bisphenol S, 2-ethylcyclohexyldimethanol, neopentyl glycol, cyclohexyldimethanol or glycerol (such an alcohol component may be substituted with a hydroxyl group or the like); polyacrylic acid ester resins or polymethacrylic acid ester resins such as polymethyl methacrylate, polybutyl methacrylate, polymethyl acrylate and polybutyl acrylate; polycarbonate resins; polyvinyl acetate resins; styrene acrylate resins; styrene/methacrylic acid ester copolymer resins and vinyltoluene acrylate resins. Concrete examples of the thermoplastic resins are those described in J. P. Kokai Nos. Sho 59-101,395, Sho 63-7,971, Sho 63-7,972, Sho 63-7,973 and Sho 60-294,862. Commercially available thermoplastic resins usable herein are, for example, Vylon 290, Vylon 200, Vylon 280, Vylon 300, Vylon 103, Vylon GK-140 and Vylon GK-130 (products of Toyobo Co., Ltd.); Tafton NE-382, Tafton U-5, ATR-2009 and ATR-2010 (products of Kao Corporation); Erither UE 3500, UE 3210 and XA-8153 (products of Unitika Ltd.); and Polyester TP-220 and R-188 (products of The Nippon Synthetic Chemical Industry Co., Ltd.), (B) Polyolefin resins such as polyethylene resin and polypropylene resin; copolymer resins composed of an olefin such as ethylene or propylene and another vinyl monomer; and acrylic resin, (C) Polyurethane resin, etc., (D) Polyamide resin, urea resin, etc., (E) Polysulfone resin, etc., (F) Polyvinyl chloride resin, polyvinylidene chloride resin, vinyl chloride/vinyl acetate copolymer resin, vinyl chloride/vinyl propionate copolymer resin, etc.

(G) Polyol resins such as polyvinyl butyral; and cellulose resins such as ethyl cellulose resin and cellulose acetate resin, and (H) Polycaprolactone resin, styrene/maleic anhydride resin, polyacrylonitrile resin, polyether resins, epoxy resins and phenolic resins.

The thermoplastic resins may be used either alone or in the form of a mixture of them.

The thermoplastic resin is incorporated in an amount of usually at least 20% by mass, preferably 30 to 100% by mass, based on the toner image-receiving layer.

The thermoplastic resins usable for forming the toner image-receiving layer are preferably those having physical properties described in J. P. KOKOKU Nos. Hei 5-127,413, Hei 8-194,394, Hei 8-334,915, Hei 8-334,916, Hei 9-171,265 and Hei 10-221,877.

The thermoplastic resins used for forming the toner image-receiving layer of the present invention are those capable of satisfying the requirement of the above-described physical properties of the image-forming layer after the formation of the image-receiving layer. More preferred thermoplastic resins are those capable of satisfying the requirement of the above-described physical properties of the toner image-receiving layer even when they are used alone. Two or more resins having different physical properties can be used together.

The thermoplastic resin used for forming the toner image-receiving layer is preferably the one having a molecular weight larger than that of the thermoplastic resin used for forming the toner. However, this molecular weight is not always desirable depending on the relationship between the thermodynamic properties of the toner resin and those of the thermoplastic resin used for forming the toner image-receiving layer. For example, when the softening temperature of the thermoplastic resin used for forming the toner image-receiving layer is higher than that of the toner resin, it is occasionally preferred that the molecular weights of these resins are equal or that of the thermoplastic resin used for forming the toner image-receiving layer is lower.

It is also preferred to use a mixture of resins having the same compositions but different average molecular weight as the thermoplastic resin for forming the toner image-receiving layer. The molecular weights of the thermoplastic resins used for forming the toner are preferably those described in J. P. KOKAI No. Hei 8-334,915.

The molecular weight distribution of the thermoplastic resin used for forming the toner image-receiving layer is preferably broader than that of the thermoplastic resin used for forming the toner.

The thermoplastic resins used for forming the toner image-receiving layer are preferably those suitable for use as a coating liquid. Those thermoplastic resins may be either soluble in water or dispersible in water so far as they are usable for forming the coating liquid.

The water-soluble thermoplastic resins are not particularly limited in the composition, bonding structure, molecular structure, molecular weight, molecular weight distribution, form, etc. so far as they are soluble in water. A condition necessary for obtaining a water-soluble thermoplastic resin is, for example, that the resin has a water-solubilizing group such as a hydroxyl group, a carboxylic acid group, an amino group, an amido group or an ether group.

Examples of the water-soluble thermoplastic resins are those given in Research Disclosure No. 17,643 (page 26), No. 18,716 (page 651) and No. 307,105 (pages 873 to 874), and J. P. KOKAI No. Sho 64-13,546 (pages 71 to 75). Concretely, the water-soluble thermoplastic resins usable herein are, for example, vinylpyrrolidone/vinyl acetate copolymer, styrene/vinylpyrrolidone copolymer, styrene/maleic anhydride copolymer, water-soluble polyesters, water-soluble polyurethane, water-soluble nylon and water-soluble epoxy resin.

The aqueous thermoplastic resin dispersion is suitably selected from among acrylic resin emulsion, polyvinyl acetate emulsion, SBR (styrene/butadiene/rubber) emulsion, polyester resin emulsion, polystyrene resin emulsion, urethane resin emulsion, etc. A combination of two or more of them is also usable. When a gelatin is used, it can be selected from among gelatin treated with lime, gelatin treated with an acid and so-called delimed gelatin having a reduced calcium content.

When the binder for the toner is a polyester resin, the resin for forming the toner image-receiving layer is preferably a polyester resin.

Polyester resins available on the market are, for example, Vylon 290, Vylon 200, Vylon 280, Vylon 300, Vylon 103, Vylon GK-140 and Vylon GK-130 (products of Toyobo Co., Ltd.); Tafton NE-382, Tafton U-5, ATR-2009 and ATR-2010 (Kao Corporation); Erither UE3500, UE3210, XA-8153 and KZA-7049 (products of Unitika Ltd.); and Polyester TP-220 and R-188 (products of The Nippon Synthetic Chemical Industry, Co., Ltd.). The acrylic resins available on the market are, for example, Dianal SE-5437, SE-5102, SE-5377, SE-5649, SE-5466, SE-5482, HR-169, 124, HR-1127, HR-116, HR-113, HR-148, HR-131, HR-470, HR-634, HR-606, HR-607, LR-1065, 574, 143, 396, 637, 162, 469, 216, BR-50, BR-52, BR-60, BR-64, BR-73, BR-75, BR-77, BR-79, BR-80, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116 and BR-117 (products of Mitsubishi Rayon Co., Ltd.); Eslec P SE-0020, SE-0040, SE-0070, SE-0100, SE-1010 and SE-1035 (products of Sekisui Chemical Co., Ltd.); and Hymer ST95 and ST120 (products of Sanyo Chemical Industries, Ltd.); and FM601 (a product of Mitsui Kagaku). Preferred polyester emulsions available on the market are, for example, Vironal MD-1250 and MD-1930 (products of Toyobo Co,. Ltd.); Plascoat Z-446, Z-465 and RZ-96 (products of Goo Chemical Industries Co., Ltd.); ES-611 and ES-670 (products of Dainippon Ink and Chemicals, Inc.); and Pesresin A-160P, A-210, A-515 GB and A-620 (products of Takamatsu Yushi).

The film-forming temperature of the thermoplastic resin is preferably not lower than room temperature for the storage before the printing and it is preferably not higher than 100° C. for the fixing of the toner particles.

The toner image-receiving layer used in the present invention may contain various additives for improving the thermodynamic properties of this layer, in addition to the thermoplastic resin. The additives include, for example, plasticizers, slip agents or releasing agents, crosslinking agents, emulsifying agents and dispersing agents.

As the plasticizers, well-known plasticizers for resins are usable without any limitation. The plasticizers have a function of controlling the fluidization or softening of the toner image-receiving layer by heat and/or pressure in the step of fixing the toner.

The plasticizers can be selected with reference to "*Kagaku Binran* (Handbook of Chemistry)" (edited by Nihon Kagaku-kai and published by Maruzen Co., Ltd.), "*Kaso-zai—Sono Riron to Ouyou*-(Plasticizers- The Theory and Application Thereof-)" (edited by Koichi Murai and published by Saiwai Book Publishing Co.), "*Kasozai no Kenkyu* (Study of Plusticizers), Part 1 and Part 2 (edited by Kobunshi Kagaku Kyokai", and "Handbook, Chemicals to be Incorporated into Rubber. Plastic" (edited by Rubber Digest Co.).

The plasticizers include those described as high-boiling organic solvents and heat solvents; esters described in, for example, J. P. KOKAI Nos. Sho 59-83,154, 59-178,451, 59-178,453, 59-178,454, 59-178,455, 59-178,457, 62-174, 754, 62-245,253, 61-209,444, 61-200,538, 62-9,348, 62-30, 247, 62-136,646, 62-174,754, 62-245-253, 61-209,444, 61-200,538, 62-8,145, 62-9,348, 62-30,247 and 62-136,646 and J. P. KOKAI No. Hei 2-235694 (such as phthalic acid esters, phosphoric acid esters, fatty acid esters, abietic acid esters, adipic acid esters, sebacic acid esters, azelaic acid esters, benzoic acid esters, butyric acid esters, epoxidized fatty acid esters, glycolic acid esters, propionic acid esters, trimellitic acid esters, citric acid esters, sulfonic acid esters, carboxylic acid esters, succinic acid esters, maleic acid esters, fumaric acid esters, phthalic acid esters and stearic acid esters), amides (such as fatty acid amides and sulfoamides), ethers, alcohols, lactones and polyethyleneoxy compounds.

The plasticizers are usable in the form of a mixture with the resin.

Polymers having a relatively low molecular weight can be used as the plasticizer. In this case, the molecular weight of the polymer is preferably lower than that of the binder resin to be plasticized. The molecular weight is not higher than 15,000, preferably not higher than 5,000. When a polymer plasticizer is to be used, it is preferably a polymer belonging to the same group as that of the binder resin to be plasticized. For the plasticization of a polyester resin, a polyester of a low molecular weight is preferred. Oligomers are also usable as the plasticizer.

In addition to the above-described compounds, commercially available plasticizers are usable. They include, for example, Adecacizer PN-170 and PN-1430 (Asahi Denka Kogyo K.K.); PARAPLEX-G-25, G-30 and G-40 (C. P. HALL Co.); and Ester Gum 8L-JA, Ester R-95, Pentalin 4851, FK115, 4820, 830, Luizol 28-JA, Picolastic A75, Picotex LC and Crystalex 3085 (Rika Hercules).

The plasticizer is optionally usable for relieving the stress or strain caused when the toner particles are embedded in the toner image-receiving layer (such as physical strains caused by elastic power, viscosity or the like, and strains caused by material balance of the molecule, main chain of binder, pendant part, etc.).

The plasticizer may be microscopically dispersed in the toner image-receiving layer or microscopically phase-separated in island-sea-type, or it may be thoroughly mixed with another component such as a binder to form a solution.

The plasticizer is preferably used in an amount of, for example, 0.001 to 90% by mass, preferably 0.1 to 60% by mass, and particularly preferably 1 to 40% by mass, based on the toner image-receiving layer.

The plasticizer is usable also for the purposes of controlling the slipping property (improvement in the carrying easiness by the reduction in friction), improving the offset in the fixing part (peeling of the toner or layer to the fixing part) and control of the curl balance and control of the electrification (formation of toner electrostatic image).

The slip agent or releasing agent usable, if necessary, in the present invention are used for the purpose of keeping the electrophotographic image-receiving sheet of the present invention from adhering to the fixing/heating member in the fixing step. In particular, 180° peeling strength of the toner image-receiving layer at a fixing temperature to a fixing member is preferably not higher than 0.1 N/25 mm, more preferably not higher than 0.041 N/25 mm. The 180° peeling strength can be determined according to a method of JIS K 6887 by using a surface material of the fixing member.

The slip agents or releasing agents usable for the electrophotographic image-receiving sheet of the present invention are, for example, sodium higher alkylsulfates, higher alcohol/higher fatty acid esters, Carbowax, higher alkyl phosphoric acid esters, silicone compounds, modified silicones and cured silicones.

Polyolefin waxes, fluorine oils, fluorine waxes, carnauba wax, microcrystalline wax and silane compounds are also preferred.

The slip agents and releasing agents usable herein are described in U.S. Pat. Nos. 2,882,157, 3,121,060 and 3,850,640; French Patent No. 2,180,465; British Patent Nos. 955,061, 1,143,118, 1,263,722, 1,270,578, 1,320,564, 1,320,757, 2,588,765, 2,739,891, 3,018,178, 3,042,522, 3,080,317, 3,082,087, 3,121,060, 3,222,178, 3,295,979, 3,489,567, 3,516,832, 3,658,573, 3,679,411 and 3,870,521; J. P. KOKAI No. Sho 49-5,017, 51-141,623, 54-159,221 and 56-81,841; and Research Disclosure No. 13,969.

The amount of the slip agent or releasing agent used is 5 to 500 mg/m$^2$, preferably 10 to 200 mg/m$^2$. When an oil for preventing the offset to the fixing member in the fixing part is not used or, in other words, in case of so-called oilless fixing, the amount of the slip agent or releasing agent used is, for example, 30 to 3,000 mg/m$^2$, preferably 100 to 1,500 mg/m$^2$.

Because waxy slip agent or releasing agent is scarcely soluble in organic solvents, it is preferred that an aqueous dispersion thereof is prepared and then a dispersion thereof with a thermoplastic resin solution is prepared and used. Wax slip agents or releasing agents are present in the form of fine particles in the thermoplastic resin. In this case, the amount of the slip agent is 5 to 10,000 mg/m$^2$, preferably 50 to 5,000 mg/m$^2$.

The slip agents or releasing agents are, for example, silicon compounds, fluorine compounds and waxes.

As the slip agents or releasing agents, there can be generally used compounds described in "*Kaitei, Wax no Seishitsu to Oyo* (Properties and Application of Waxes, Revised Edition)" (published by Saiwai Shobo) and "Silicone Handbook" published by The Nikkan Kogyo Shinbun Ltd. Further, silicone compounds, fluorine compounds and waxes described in the following specifications are preferred: J. P. KOKOKU Nos. Sho 59-38,581 and Hei 4-32,380; J. Patent Nos. 2,838,498 and 2,949,558; J. P. KOKAI Nos. Sho 50-117,433, 52-52,640, 57-148,755, 61-62,056, 61-62,057 and 61-118,760; and J. P. KOKAI Nos. Hei 2-42,451, 3-41,465, 4-212,175, 4-214,750, 4-263,267, 5-34,966, 5-119,514, 6-59,502, 6-161,150, 6-175,396, 6-219,040, 6-230,600, 6-295,093, 7-36,210, 7-43,940, 7-56,387, 7-56,390, 7-64,335, 7-199,681, 7-223,362, 7-287,413, 8-184,992, 8-227,180, 8-248,671, 8-248,799, 8-248,801, 8-278,663, 9-152,739, 9-160,278, 9-185,181, 9-319,139, 9-319,143, 10-20,549, 10-48,889, 10-198,069, 10-207,116, 11-2,917, 11-44,969, 11-65,156, 11-73,049 and 11-19,454. A combination of two or more of these compounds can also be used.

Examples of the silicon compounds include silicone oils such as non-denatured silicone oils (such as dimethylsiloxane oil, methyl hydrogen silicone oil, phenyl methyl silicone oil, and commercial products such as KF-96, KF-96L, KF-96H, KF-99, KF-50, KF-54, KF-56, KF-965, KF-968, KF-994, KF-995, HIVAC F-4 and F-5 (Shin-Etsu Chemical Co., Ltd.); and SH200, SH203, SH490, SH510, SH550, SH 710, SH704, SH705, SH7028A, SH7036, SM7060, SM7001, SM7706, SH7036, SH8710, SH1107 and SH8627 (Toray Dow Corning Silicone Co.).

The fluorine compounds include fluorine oils [commercial products: Daifloyl #1, #3, #10, #20, #50 and #100 and Unidyn TG-440, TG-452, TG-490, TG-560, TG-561, TG-590, TG-652, TG-670U, TG-991, TG-999, TG-3010, TG-3020 and TG-3510 (Daikin industries, Ltd.); MF-100, MF-110, MF-120, MF-130, MF-160 and MF-160E (Tohchem Products); Surfuron S-111, S-112, S-113, S-121, S-131, S-132, S-141 and S-145 (Asahi Glass Co., Ltd.); and FC-430 and FC-431 (Mitsui Fluorochemical)]; fluorine rubbers [LS63U (Toray Dow Corning Silicone Co.); fluorine modified resins [Modipar F200, F220, F600, F2020 and F3035 (Nippon Oils and Fats Co., Ltd.); and Diaromer FF203 and FF204 (Dainichiseika Colour & Chemicals Mfg. Co., Ltd.).

The waxes include petroleum waxes such as paraffin waxes [Paraffin Wax 155, 150, 140, 135, 130, 125, 120 and 115, HNP-3, HNP-5, HNP-9, HNP-10, HNP-11, HNP-12, HNP-14G, SP-0160, SP-0145, SP-1040, SP-1035, SP-3040, SP-3035, NPS-8070, NPS-L-70, OX-2151, OX-2251, EMUSTAR-0384 and EMUSTAR-0136 (Nippon Seiro Co., Ltd.); Serozol 686, 428, 651-A, A, H-803, B-460, E-172, 866, K-133, Hydrin D-337 and E-139 (Chukyo Yushi); and 125° paraffin, 125° FD, 130° paraffin, 135° paraffin, 135° H, 140° paraffin, 140° N, 145° paraffin and paraffin wax M (Nisseki Mitsubishi Oil Co., Ltd.)].

The slipping agents or releasing agents incorporated, if necessary, into the toner image-receiving layer of the present invention include derivatives, oxides, purified products and mixtures of those described above. They may have a reactive substituent.

In the present invention, the slip agent or releasing agent is used in an amount of, for example, 0.1 to 10% by mass, preferably 0.3 to 8.0% by mass, and particularly preferably 0.5 to 5.0% by mass, based on the toner image-receiving layer.

The toner image-receiving layer of the present invention can contain, if desired, an organic or inorganic pigment or filler in an amount of not larger than 40% by mass, preferably not larger than 30% by mass and more preferably not larger than 20% by mass based on the thermoplastic resin constituting the toner image-receiving layer so far as the intended purpose of the present invention is not inhibited. It is desirable that the toner image-receiving layer is substantially free of any pigment or filler. When the amount of the pigment or filler contained therein is smaller than 40% by mass, the blister formation is prevented and the roughening of the toner image can be advantageously reduced.

As the pigments or fillers which can be incorporated into the toner image-receiving layer, those well-known as reinforcing agents or fillers for the binder resins are usable. The fillers can be selected with reference to "*Binran Gomu. Plastic Haigo Yakuhin* (Handbook of Chemicals to be Incorporated into Rubbers and Plastics)" (edited by Rubber Digest Co.), "*Plastic Haigozai, Kiso to Oyo* (Additives to Plastics, Base and Application, New Edition) (published by Taisei Co.) and "Filler Handbook" (published by Taisei Co.).

The pigments or fillers usable herein include various inorganic pigments or fillers. The inorganic pigments are, for example, titanium dioxide, silica, alumina, zinc oxide, zirconium oxide, mica-like iron oxide, white lead, lead oxide, cobalt oxide, strontium chromate, molybdenum pigments, smectites, magnesium oxide, calcium oxide, calcium carbonate and mullite. As the fillers, silica and alumina are particularly preferred. Two or more fillers can be used together.

A static charge controlling agent is preferably incorporated into the toner image-receiving layer of the present invention for controlling the toner transfer and adhesion and also for preventing the electrostatic adhesion of the toner image-receiving layer. The static charge controlling agents are those known in the art. They include surfactants such as cationic surfactants, anionic surfactants, amphoteric surfactants and nonionic surfactants, high-molecular electrolytes and conductive metal oxides.

The static charge controlling agents include cationic antistatic agents such as quaternary ammonium salts, polyamide derivatives, cation modified polymethyl methacrylate and cation modified polystyrene; anionic antistatic agents such as alkyl phosphates and anionic polymers; and non-ionic antistatic agents such as fatty acid esters and polyethylene oxides. However, the static charge controlling agents are not limited to them.

When the toner has a negative electric charge, the electric charge controlling agent to be incorporated into the toner image-receiving layer is preferably cationic or nonionic.

The conductive metal oxides are, for example, ZnO, $TiO_2$, $SnO_2$, $Al_2O_3$, $In_2O_3$, $SiO_2$, MgO, BaO and $MoO_3$. Those conductive metal oxides are usable either alone or in the form of a complex oxides of them. The metal oxides may further contain other elements. For example, ZnO can contain Al, In or the like, $TiO_2$ can contain Nb, Ta or the like, and $SnO_2$ can contain Sb, Nb, halogen elements or the like (doping).

The toner image-receiving layer used in the present invention preferably has a surface electric resistance in the range of $1\times10^6$ to $1\times10^{15}$ Ω (under conditions of 25° C., 65% RH). When it is below $1\times10^6$ Ω, the amount of the toner is insufficient when the toner is transferred to the toner image-receiving layer, and the obtained toner image density is inclined to be low. On the contrary, when the surface electric resistance is above $1\times10^{15}$ Ω, the electric charge is formed excessively in the transfer, the toner is not sufficiently transferred, the density of the image is low, dust easily adheres to the electrophotographic image-receiving sheet with static electricity while the sheet is handled, and misfeeding, double feeding, discharge mark and toner transfer error are caused unfavorably.

The optimum surface electric resistance of a transparent toner image-receiving layer is $10^{10}$ to $10^{13}$ $\Omega/cm^2$, preferably $5\times10^{10}$ to $5\times10^{12}$ $\Omega/cm^2$. The amount of the antistatic agent used is such that the surface electric resistance will be in this range. The surface electric resistance on the back surface of the base paper (opposite to the toner image-receiving layer) is $5\times10^8$ to $3.2\times10^{10}$ $\Omega/cm^2$ preferably $1\times10^9$ to $1\times10^{10}$ $\Omega/cm^2$.

The surface electric resistance is determined according to JIS K 6911. Namely, water content of a sample is controlled by keeping it in an atmosphere having a temperature of 20° C. and a humidity of 65% for at least 8 hours, and then applying an electric current to the sample under 100 V with R8340 (Advantest Corporation) under the same environmental conditions as above for 1 minute, and then the surface electric resistance is determined.

The toner image-receiving layer of the electrophotographic image-receiving sheet of the present invention may contain a fluorescent brightening agent, white pigment, coloring pigment, dye, etc. for improving the image quality, particularly degree of whiteness.

The fluorescent brightening agents are compounds having an absorption band in a near-ultraviolet zone and emit the fluorescence in the range of 400 to 500 nm. Well-known fluorescent brightening agents are usable without any limitation. Preferred fluorescent brightening agents are, for example, compounds described in The Chemistry of Synthetic Dyes (edited by K. Veen Rataraman), Volume V, Chapter 8. Concretely, they include stilbene compounds, coumarin compounds, biphenyl compounds, benzoxazoline compounds, naphthalimide compounds, pyrazoline compounds and carbostyryl compounds. Examples of them include White Falfar PSN, PHR, HCS, PCS and B (Sumitomo Chemical Co., Ltd.) and UVITEX-OB (Ciba-Geigy).

As the white pigments, the inorganic pigments (titanium oxide, calcium carbonate, etc.) described above with reference to the fillers are usable. The coloring pigments include various pigments described in, for example, J. P. KOKAI No. Sho 63-44653 and azo pigments (azo lakes such as Carmine 6B and Red 2B; insoluble azo pigments such as Monoazo Yellow, Disazo Yellow, Pyrazolo Orange and Vulcan Orange; and condensed azo pigments such as Chromophthal Yellow and Chromophthal Red), polycyclic pigments (phthalocyanine pigments such as Copper Phthalocyanine Blue and Copper Phthalocyanine Green; dioxazine pigments such as Dioxazine Violet; isoindolinone pigments such as Isoindolinone Yellow; threne pigments such as perylene, perinone, flavanthrone and thioindigo), lake pigments (Malachite Green, Rhodamine B, Rhodamine G and Victoria Blue B) and inorganic pigments such as oxides, titanium dioxide, red iron oxide, sulfates (precipitated barium sulfate), carbonates (precipitated calcium carbonate), silicates (hydrous silicates and anhydrous silicates) and metal powders (aluminum powder, bronze powder, zinc powder, carbon black, chrome yellow and Prussian blue).

As the dyes, various well-known dyes are usable. The oil-soluble dyes include anthraquinone compounds and azo compounds. Examples of the water-insoluble dyes include vat dyes such as C.I. Vat Violet 1, C.I. Vat Violet 2, C.I. Vat Violet 9, C.I. Vat Violet 13, C.I. Vat Violet 21, C.I. Vat Blue 1, C.I. Vat Blue 3, C.I. Vat Blue 4, C.I. Vat Blue 6, C.I. Vat Blue 14, C.I. Vat Blue 20 and C.I. Vat Blue 35; disperse dyes such as C.I. Disperse Violet 1, C.I. Disperse Violet 4, C.I. Disperse Violet 10, C.I. Disperse Blue 3, C.I. Disperse Blue 7 and C.I. Disperse Blue 58; and oil-soluble dyes such as C.I. Solvent Violet 13, C. I. Solvent Violet 14, C.I. Solvent Violet 21 and C.I. Solvent Violet 27, C. I. Solvent Blue 11, C.I. Solvent Blue 12, C.I. Solvent Blue 25 and C.I. Solvent Blue 55.

Colored couplers used for the silver salt photography are also preferably used.

The toner image-receiving layer of the electrophotographic image-receiving sheet of the present invention preferably has a high degree of whiteness. As for the degree of whiteness, L* value in CIE 1976 (L*a*b*) color space is at least 80, preferably at least 85 and more preferably at least 90. The tinge of the white color is desirably as neutral as possible. As for the tinge of the white color, the value of (a*)2+(b*)2 in L*a*b* space is preferably not higher than 50, more preferably not higher than 18 and most preferably not higher than 5.

The toner image-receiving layer of the present invention preferably has a high surface gloss. As for the surface gloss, 45° surface gloss in the whole zone ranging from white (no toner) to black (maximum toner concentration) is preferably not lower than 60, more preferably not lower than 75 and most preferably not lower than 90. However, the surface gloss is preferably not higher than 110. When it is higher than 110, the gloss is like a metallic gloss which is unsuitable for the image quality.

The surface gloss can be determined according to JIS Z 8741.

The smoothness of the toner image-receiving layer used in the present invention is preferably high. As for the degree of smoothness, the arithmetic mean roughness (Ra) in the whole zone ranging from white (no toner) to black (maximum toner density) is preferably not higher than 3 $\mu$m, more preferably not higher than 1 $\mu$m and most preferably not higher than 0.5 $\mu$m.

The arithmetic mean roughness can be determined according to JIS B 0601, B 0651 and B 0652.

The toner image-receiving layer used in the present invention may contain various antioxidants, agents for preventing aging, agents for preventing deterioration, agents for preventing deterioration caused by ozone, ultraviolet absorbers, light stabilizers, antiseptics and antifungal agents for improving the stability of the output image and also the stability of the image-receiving layer per se.

The antioxidants include, for example, chroman compounds, coumaran compounds, phenol compounds (such as hindered phenol), hydroquinone derivatives, hindered amine derivatives and spiroindane compounds. The antioxidants usable herein are those described in J. P. KOKAI Sho 61-159644.

The agents for preventing aging are, for example, those described on pages 76 to 121 of *Binran Gomu. Plastic Haigo Yakuhin* (Handbook of Chemicals to be Incorporated into Rubbers and Plastics)" (edited by Rubber Digest Co. in 1993).

The ultraviolet absorbers are, for example, benzotriazole compounds (U.S. Pat. No. 3,533,794), 4-thiazolidone compounds (U.S. Pat. No. 3,352,681), benzophenone compounds (J. P. KOKAI No. Sho 46-2784) and ultraviolet absorbing polymers (J. P. KOKAI No. Sho 62-260152).

The metal complexes are, for example, those described in U.S. Pat. Nos. 4,241,155, 4,245,018 and 4,254,195, and J. P. KOKAI Nos. Sho 61-88,256, Sho 62-174,741, Sho 63-199,248, Hei 1-75,568 and Hei 1-74,272.

Further, ultraviolet absorbers and photo stabilizers described on pages 122 to 137 of *Binran Gomu. Plastic Haigo Yakuhin* (Handbook of Chemicals to be Incorporated into Rubbers and Plastics)" (edited by Rubber Digest Co.) are also preferably used.

The toner image-receiving layer in the present invention can further contain known photographic additives. The photographic additives are described in Research Disclosure (hereinafter referred to as "RD") Nos. 17,643 (December, 1978), 18,716 (November, 1979) and 307,105 (November, 1989). The corresponding positions in RD are summarized in the following table.

| Additive | RD 17643 | RD 18,716 | RD 307,105 |
|---|---|---|---|
| Whitening agent | p. 24 | p. 648, right column | p. 868 |
| Stabilizer | pp. 24–25 | p. 649, right column | pp. 868–870 |
| Light absorber UV absorber | pp. 25–26 | p. 649, right column | p. 873 |
| Dye image stabilizer | p. 25 | p. 650, right column | p. 872 |
| Hardening agent | p. 26 | p. 651, left column | pp. 874–875 |
| Binder | p. 26 | p. 651, left column | pp. 873–874 |
| Plasticizer, lubricant | p. 27 | p. 650, right column | p. 876 |
| Coating aid Surfactant | pp. 26–27 | p. 650, right column | pp. 875–876 |
| Antistatic agent | p. 27 | p. 650, right column | pp. 876–877 |

Protecting Layer

A protecting layer can be provided on the surface of the toner image-receiving layer of the electrophotographic image-receiving sheet of the present invention for the purposes of protecting the surface, improving the storability and handleability, imparting possibility of autography, improving passability through machines and imparting anti-offset property. The protecting layer may be composed of one layer or two or more layers. The protecting layer may contain various thermoplastic resins and thermosetting resins as binders. The resin is preferably the same as that used in the toner image-receiving layer. However, the thermodynamic properties and electrostatic properties of the protecting layer are not necessarily the same as those of the toner image-receiving layer, and the respective layers can have optimum properties.

The protecting layer can contain the above-described various additives usable for the toner image-receiving layer. In particular, the protecting layer can contain, for example, plasticizers, releasing agents and slip agents.

The outmost surface layer (for example, the surface-protecting layer when it is provided) of the electrophotographic image-receiving sheet of the present invention preferably has a high compatibility with the toner from the viewpoint of the fixing property. Concretely, the angle of contact with the molten toner is preferably, for example, 0 to 40°.

Back Layer

The back polyolefin resin layer of the present invention can have a back layer for the purposes of providing output ability at the backside image, improving the backside image output image quality, improving the curl balance and improving the passability through the machines.

The composition of the back layer of the electrophotographic image-receiving sheet may be the same as that of the toner image-receiving layer for the purpose of improving the both sides output ability. The back layer can contain various additives described above with reference to the toner image-receiving layer. An electrification controlling agent is suitable as the additive. The back layer may comprise either one layer or two or more layers.

The back layer may be an oil-absorbing layer when a releasing oil is used for a fixing roller or the like for preventing offset in the fixing step.

The back layer is prepared with a coating liquid in the same manner as that in the preparation of the toner image-receiving layer on the base paper surface. In this step, a thermoplastic resin for forming the back layer can be infiltrated into the base paper through the back surface to a predetermined depth in the thickness direction. The depth is preferably the same as the depth of the thermoplastic resin for forming the toner image-receiving layer. A second toner image-receiving layer may be formed in place of the back layer for the purpose of improving the both-side output property. This layer is preferably formed in the same manner as that in the formation of the infiltrating part.

Toner for Color Electrophotography

The electrophotographic image-receiving sheet of the present invention is used in combination with a toner or toner particles in the printing or copying. The toner used in the present invention can be obtained by a pulverization method or a suspension granulation method.

In the pulverization method, the toner is obtained by kneading, pulverization and classification. Binder resins usable for the production of the toner by the pulverization include, for example, acids such as acrylic acid, methacrylic acid and maleic acid and esters thereof; polyesters; polysulfonates; polyethers; and resins, obtained by polymerizing monomers, such as polyurethanes, and resins obtained by copolymerizing two or more of the monomers. These resins are thoroughly kneaded with other materials for constituting the toner by means of a hot kneader such as a hot roll, kneader or extruder and then mechanically pulverized and classified.

The toner thus obtained preferably contains 0.1 to 10% by mass, particularly 0.5 to 7% by mass, based on the toner, of a wax component.

In the suspension granulation method, the toner is obtained by mixing a binder, a colorant and a releasing agent (and, if necessary, a magnetic substance, an antistatic agent and other additives) in a solvent having no affinity for water, the obtained composition is covered with a polymer having a carboxyl group, dispersing the obtained product in an aqueous medium in the presence of a hydrophilic inorganic dispersing agent having a BET specific surface area of 10 to 50 $m^2/g$ and/or a viscosity regulator, diluting, if necessary, the obtained suspension with an aqueous medium and removing the solvent by heating the obtained suspension and/or reducing the pressure. In the present invention, the toner produced by the suspension granulation method is preferably used. In some cases, the results obtained by using the toner obtained by the suspension granulation method are superior to those obtained by using the toner obtained by the pulverization method.

The binder used for obtaining toners by the suspension granulation method is any of known binder resins. Concretely, those resins are homopolymers and copolymers such as styrenes, e.g. styrene and chlorostyrene; monoolefins, e.g. ethylene, propylene, butylene and isoprene; vinyl esters, e.g. vinyl acetate, vinyl propionate, vinyl benzoate and vinyl butyrate; α-methylene aliphatic monocarboxylic acid esters, e.g. methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers, e.g. vinyl methyl ether, vinyl ethyl ether and vinyl butyl ether; and vinyl ketones, e.g. vinyl methyl ketone, vinyl hexyl ketone and vinyl isopropenyl ketone. Particularly typical binder resins include polystyrene resin, polyester resin, styrene/alkyl acrylate copolymers, styrene/alkyl methacrylate copolymers, styrene/acrylonitrile copolymer, styrene/butadiene copolymer, styrene/maleic anhydride copolymer, polyethylene resin and polypropylene resin. They further include polyurethane resin, epoxy resin, silicone resin, polyamide resin, modified rosin, paraffins and waxes. In those resins, a styrene/acrylic resin is preferred in the present invention.

The colorants to be incorporated into the toner binder are well-known colorants without any limitation. The typical examples of the colorants are carbon black, Aniline Blue, Calcoil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1 and C.I. Pigment Blue 15:3.

The colorant content is, for example, 2 to 8% by mass and preferably 4 to 6% by mass. When the colorant content is less than 2% by mass, the coloring power is easily weakened and, on the contrary, when it is more than 8% by mass, the transparency of the color toner is easily reduced.

The toner preferably contains a releasing agent. The releasing agents preferably used herein are, for example, waxes. Concretely, the releasing agents usable herein are low-molecular weight polyolefins such as polyethylene, polypropylene and polybutene; silicone resins which can be softened by heating, fatty acid amides such as oleamide, erucamide, ricinoleamide and stearamide; vegetable waxes such as carnauba wax, rice wax, candelilla wax, Japan wax and jojoba oil; animal waxes such as bees wax; mineral and petroleum waxes such as montan wax, ozocerite, ceresine, paraffin wax, microcrystalline wax and Fischer-Tropsch wax; and modified products of them. When a wax containing a wax ester having a high polarity, such as carnauba wax or candelilla wax, is used as the releasing agent, the amount of the wax exposed to the toner particle surface is inclined to be large. On the contrary, when a wax having a low polarity such as polyethylene wax or paraffin wax is used, the amount of the wax exposed to the toner particle surface is inclined to be small.

Irrespective of the inclination of the exposure to the surface, waxes having a melting point in the range of 30 to 150° C. are preferred and those having a melting point in the range of 40 to 140° C. are more preferred.

The toner used in the present invention is mainly composed of the above-described coloring agent and binder. The average particle diameter of the toner is, for example, 3 to 15 μm, preferably 4 to 8 μm. The storage elastic modulus G' of the toner per se (determined at an angular frequency of 10 rad/sec) at 150° C. is preferably in the range of 10 to 200 Pa.

The toner used in the present invention may contain an additive. Fine powders of inorganic and organic compounds are used as the additive. Fine particles of the inorganic compounds are those of, for example, $SiO_2$, $TiO_2$, $Al_2O_3$, CuO, ZnO, $SnO_2$, $Fe_2O_3$, MgO, BaO, CaO, $K_2O$, $Na_2O$, $ZrO_2$, CaO. $SiO_2$, $K_2O$. $(TiO_2)_n$, $Al_2O_3$. $2SiO_2$, $CaCO_3$, $MgCO_3$, $BaSO_4$ and $MgSO_4$. The fine particles of organic compounds are those of fatty acids and derivatives thereof and metal salts thereof, and also those of resins such as fluororesins, polyethylene resins and acrylic resins.

Image-Forming Apparatus and Method

The method for forming an image on the electrophotographic image-receiving sheet of the present invention is not particularly limited. Various electrophotographic methods can be employed.

For example, a color image can be suitably formed on the electrophotographic image-receiving sheet of the present invention. A color image can be formed with an electrophotographic apparatus capable of forming a full-colored image. An ordinary electrophotographic apparatus is composed of an image-receiving sheet sending part, a latent image-forming part and a developing part placed close to the latent image-forming part. In some apparatus, an intermediate toner image-transfer part is placed close to the latent image-forming part and the image-receiving sheet sending part at a center of the apparatus.

For improving the image quality, an adhesion transfer method or a heat-supporting transfer method to be conducted in place of or in combination with the electrostatic transfer or bias roller transfer method is known. The structures of the transfer apparatus is described in, for example, J.P. KOKAI Nos. Sho 63-113,576 and Hei 5-341,666. The heat-supporting transfer method wherein an intermediate transfer belt is used is preferred particularly when a toner having a small particle diameter (not larger than 7 $\mu$m) is used. The intermediate belt is, for example, an endless belt made of electroformed nickel. This belt has a thin silicone or fluorine film on the surface thereof so as to have a releasing property. Preferably, the intermediate belt used after the toner transfer to the electrophotographic image-receiving sheet or in the latter half of the stage of the transfer is provided with a cooling device. With the cooling device, the toner is cooled to a temperature lower than the softening point of the binder or lower than the glass transition temperature thereof, then efficiently transferred to the electrophotographic image-receiving sheet to make the release thereof from the intermediate belt possible.

The fixing is an important step for the gloss and smoothness of the final image. For the fixing, a method wherein a heating pressure roller is used and another method wherein a belt is used are known. From the viewpoints of the image qualities such as gloss and smoothness, the belt fixing method is preferred. As for this method, a method described in J. P. KOKAI No. Hei 11-352,819 wherein an oilless type belt is used and also a method described in J.P. KOKAI Nos. Hei 11-231,671 and Hei 5-341,666 wherein the secondary transfer and the fixing are performed at the same time are known. The primary fixing with a hot roller may be conducted before the pressing and heating with a fixing belt and a fixing roller.

The surface of the fixing belt is preferably treated with a surface-treating agent containing silicon, fluorine or a combination of them for preventing the peeling of the toner or the offset of the toner component. In the latter half of the fixing step, a cooling apparatus for the belt is preferably provided to facilitate the release of the electrophotographic image-receiving sheet. The cooling temperature is preferably lower than the softening point or glass transition point of the toner binder and/or the polymer in the toner image-receiving layer of the electrophotographic image-receiving sheet. On the other hand, in the initial stage of the fixing, the temperature must be elevated to a point at which the toner image-receiving layer of the electrophotographic image-receiving sheet or the toner is sufficiently softened. Concretely, the cooling temperature is practically preferably 30 to 70° C., and the temperature in the initial stage of the fixing is 100 to 180° C.

The following Examples and Comparative Examples will further illustrate the present invention, which by no means limit the scope of the present invention.

In the following Examples and Comparative Examples, percentages and parts are given by mass.

EXAMPLE 1

Preparation of Base Paper

A bleached craft pulp of broadleaf trees was beaten to 300 cc (Canadian standard freeness; C. F. S.) with a disc refiner. The fiber length of the pulp was adjusted to 0.58 mm. The following additives were added in amounts (% by mass based on the pulp) shown below to the obtained pulp stock:

| Additive | Amount (%) |
|---|---|
| Cationic starch | 1.2 |
| Alkyl ketene dimer (AKD) | 0.5 |
| Anionic polyacrylamides | 0.3 |
| Epoxidized fatty acid amides (EFA) | 0.2 |
| Polyamide polyamine epichlorohydrin | 0.3 |

Note)
AKD represents an alkylketene dimer (the alkyl in these compounds is derived from fatty acids mainly comprising behenic acid), and EFA represents epoxidized fatty acid amides (the fatty acid parts in these compounds are derived from fatty acids mainly comprising behenic acid).

From the pulp stock thus obtained, a base paper having a basis weight of 150 g/m$^2$ was produced with Fourdrinier machine. 1.0 g/m$^2$ of PVA and 0.8 g/m$^2$ of $CaCl_2$ were added to the paper with a size press device in the middle of a drying zone of Fourdrinier machine.

In the final stage of the paper-making step, the density of the paper was controlled at 1.01 g/cm$^3$ with a soft calender. The obtained base paper was treated in such a manner that the surface thereof on which a toner image-receiving layer was to be formed was brought into contact with a metal roll. The metal roll had a surface temperature of 140° C. The obtained base paper had an Oken-shiki smoothness of 265 seconds and a Stoekight sizing degree of 127 seconds.

Preparation of Coating Liquid for Forming Toner Image-Receiving Layer (Titanium Dioxide Dispersion)

The following components were mixed by means of NBK-2 (Nihon Seiki Seisakusho) to obtain a titanium dioxide dispersion (titanium dioxide pigment content: 40% by mass).

| | |
|---|---|
| Titanium dioxide [Typaque (registered trade name) A-220, Ishihara Sangyo Kaisha, Ltd.] | 40.0 g |
| PVA 102 | 2.0 g |
| Ion-exchanged water | 58.0 g |

(Coating Liquid for Forming Toner Image-Receiving Layer)

The following components were stirred together to obtain a coating liquid for forming the toner image-receiving layer:

| | |
|---|---|
| The above-described titanium dioxide dispersion | 15.5 g |
| Carnauba wax dispersion (Serozol 524, Chukyo Yushi) | 15.0 g |
| Aqueous polyester resin dispersion (solid content 30%, KZA-7049, Unitika Ltd.) | 100.0 g |
| Thickening agent (Alcoks E 30, Meisei Kagaku) | 2.0 g |
| Anionic surfactant (AOT) | 0.5 g |
| Ion-exchanged water | 80 ml |

The resultant coating liquid for forming the toner image-receiving layer (containing 21% by mass, based on the polyester resin, of titanium dioxide) had a viscosity of 40 mPa. s and a surface tension of 34 mN/m.

Preparation of Coating Liquid for Forming Back Layer

The following components were stirred together to obtain a coating liquid for forming the back layer:

| | |
|---|---|
| Aqueous acrylic resin dispersion (solid content 30%, Hylos XBH-997L, Seikou Kagaku) | 100.0 g |
| Matting agent (Techpomer MBX-12, Sekisui Plastics Co., Ltd.) | 5.0 g |
| Releasing agent (Hydrin D 337, Chukyo Yushi) | 10.0 g |
| Thickening agent (CMC) | 2.0 g |
| Anionic surfactant (AOT) | 0.5 g |
| Ion-exchanged water | 80 ml |

The coating liquid for forming the back layer had a viscosity of 35 mPa · s and a surface tension of 33 mN/mn.

Coating for Forming Back Layer and Toner Image-Receiving Layer

The coating liquid for forming the back layer was applied to the back surface of the resultant base paper with a bar coater. Then, the coating liquid for forming the toner image-receiving layer was applied to the surface of the base paper with the bar coater in the same manner as in the formation of the back layer.

The amount of the coating liquid used for forming the back layer was 9 g/m$^2$ (dry mass) and that used for forming the toner image-receiving layer was 12 g/m$^2$ (dry mass).

After the application of the coating liquids, the back layer and the toner image-receiving layer thus formed were dried with hot air on the line. The drying air and temperature were controlled so that the back surface and the toner image-receiving surface would be dried within 2 minutes after the application. The drying temperature was controlled so that the temperature of the surface of the coating would be equal to the wet-bulb temperature of the drying air.

After the drying, the calender treatment was conducted. The calender treatment was conducted with a gross calender under a pressure of 147 N/cm (15 Kgf/cm) while the metal roller was kept at 40° C.

The deepness of the infiltration of the thermoplastic resin into the base paper was determined by measuring it on a section of the base paper with a scanning electron microscope. Concretely, the electrophotographic image-receiving sheet was sliced in the thickness direction to obtain slices having a predetermined thickness. Each slice was dyed with a dye capable of dyeing only the thermoplastic resin used. An enlargement of the section of the base paper was made with the scanning electron microscope. The deepness of the infiltration of the thermoplastic resin was calculated in terms of the percentage based on the thickness of the base paper. The results are shown in Table 1 given below.

Evaluation

The whole toner image-receiving surface was black-printed with DocuColor 1250 PF((Fuji Xerox Co., Ltd.) except that a fixing belt system shown in FIG. 1 was used. After the printing, the fixing was conducted while keeping the printed surface upward by means of the fixing belt system shown in FIG. 1.

Namely, in a fixing belt system 1 shown in FIG. 1, a fixing belt 2 is set over a heating roller 3 and a tension roller 5. A cleaning roller 6 is placed over the tension roller 5 via the fixing belt 2. A pressure roller 4 is provided below the heating roller 3 via the fixing belt 2. An electrophotographic image-receiving sheet having a latent toner image is inserted between the heating roller 3 and the pressure roller 4 on the right side in FIG. 1, pressed and heated and then moved with the fixing belt 2. The sheet is then cooled with a cooling device 7 provided downstream with the fixing belt 2. Thereafter, the electrophotographic image-receiving sheet is peeled from the fixing belt 2. The fixing belt 2 is cleaned with a cleaning roller 6 placed after the tension roller 5.

In this fixing belt system, the transfer speed of the fixing belt 2 was 30 mm/sec; the nip pressure between the heating roller 3 and the pressure roller 4 was 0.2 MPa (2 kgf/cm$^2$); and the temperature of the heating roller 3 was set at 150° C., which corresponded to the fixing temperature. The temperature of the pressure roller 4 was set at 120° C. The electrophotographic image-receiving sheet had been cooled to 60° C. or below before it was peeled from the fixing belt 2.

In the printing, the sheet used was "Cardboard 2", the color mode was "Color", the printing mode was "Image quality to be preferential" and the recommended image quality type was "Photograph (suitable for photographic sheet only)".

The image-receiving sheet thus printed was cut into pieces of a size of 20 cm×20 cm and the pieces were kept under conditions of 28° C. and 85% RH for 16 hours.

Determination of Curling Property

The pieces of the electrophotographic image-receiving paper thus kept under the above-described conditions were placed on a flat table in such a manner that the in-curled surfaces thereof were kept upward. The heights of the four corners of each piece (the distance of each corner from the surface of the table) were measured, and the total of them was taken as the curling property. The results are shown in Table 1 given below. The curling property is preferably less than 25 mm.

Evaluation of Cracking Property

The cracks on the image on the black printed surface was macroscopically examined. The results of the evaluation were classified into the following 5 groups:

Standard of Evaluation

◎: No cracks were found at all in the macroscopic observation.

○: No cracks were found in the macroscopic observation.

Δ: Cracks were found a little in the macroscopic observation.

x: Cracks were clearly found in the macroscopic observation.

xx: The falling of the toner or the toner image-receiving layer was observed.

EXAMPLES 2 TO 8 AND COMPARATIVE EXAMPLES 1 TO 3

Electrophotographic image-receiving sheets were prepared in the same manner as that in Example 1 except that the viscosity and surface tension of the coating liquid for forming the toner image-receiving layer and the coating liquid for forming the back layer, the drying time for the coating liquid, and the pressure and temperature in the calender treatment were altered as shown in Table 1 given below. The deepness of the infiltration in the obtained electrophotographic image-receiving sheets and the anti-curling properties and the anti-cracking properties of the sheets were examined in the same manner as that in Example 1. The resultant results are also shown in the following Table 1.

TABLE 1

| | Coating liquid for toner image-receiving layer | | Coating liquid for back layer | | | Calender treatment | | | | |
|---|---|---|---|---|---|---|---|---|---|---|
| | Viscosity mPa · s | Surface tension mN/m | Viscosity mPa · s | Surface tension mN/m | Drying time (min) | Pressure N/cm (Kgf/cm) | Temperature (° C.) | Infiltration depth (%) | Curling (mm) | Anti-cracking property |
| Ex. 1 | 40 | 34 | 35 | 33 | 2 | 147 (15) | 40 | 11 | 9 | ○ |
| Ex. 2 | 40 | 39 | 35 | 38 | 2 | 147 (15) | 40 | 5 | 13 | ◎ |
| Ex. 3 | 74 | 34 | 81 | 33 | 2 | 147 (15) | 40 | 2 | 19 | ◎ |
| Ex. 4 | 123 | 34 | 131 | 33 | 2 | 147 (15) | 40 | 1 | 22 | ◎ |
| Ex. 5 | 40 | 34 | 35 | 33 | 0.75 | 147 (15) | 40 | 9 | 11 | ◎ |
| Ex. 6 | 40 | 34 | 35 | 33 | 0.4 | 147 (15) | 40 | 5 | 14 | ◎ |
| Ex. 7 | 40 | 34 | 35 | 33 | 2 | 392 (40) | 40 | 36 | 2 | ○ |
| Ex. 8 | 40 | 34 | 35 | 33 | 2 | 392 (40) | 90 | 50 | 0 | ○ |
| Comp. Ex. 1 | 40 | 34 | 35 | 33 | 2 | none | none | 0.7 | 27 | X |
| Comp. Ex. 2 | 40 | 39 | 35 | 38 | 2 | none | none | 0.2 | 41 | X X |
| Comp. Ex. 3 | 74 | 39 | 81 | 38 | 2 | 147 (15) | 40 | 0.5 | 35 | X |

It is clear from Table 1 given above that, when the thermoplastic resin for forming the toner image-receiving layer is infiltrated to a thickness of 1 to 50% of the base paper, excellent anti-curling property and anti-cracking property can be obtained.

According to the present invention, image-receiving sheets for electrophotography, comprising (1) a base paper and (2) a toner image-receiving layer formed thereon and having an excellent property of preventing the curling and only a slight cracking property of the image surface, can be easily obtained by incorporating as small as possible amount of a pigment into the toner image-receiving layer and making a thermoplastic resin constituting the toner image-receiving layer to be infiltrated to a predetermined depth of the base paper.

What is claimed is:

1. An image-receiving sheet for electrophotography, comprising:

(1) a base paper; and (2) a toner image-receiving layer comprising a thermoplastic resin formed on at least one surface of said base paper;

wherein said toner image-receiving layer contains pigment, the image-receiving layer comprising less than 40% by mass, based on said thermoplastic resin, of the pigment; and wherein said thermoplastic resin is infiltrated to a depth of 1 to 50% of the thickness of said base paper from the surface thereof at the toner image-receiving layer side.

2. The image-receiving sheet of claim 1, wherein said thermoplastic resin is infiltrated to a depth of 1 to 10% of the thickness of said base paper from the surface thereof at the image-receiving layer side.

3. The image-receiving sheet of claim 1, wherein said toner image-receiving layer contains less than 30% by mass, based on said thermoplastic resin, of a pigment.

4. The image-receiving sheet of claim 1, wherein said toner image-receiving layer contains less than 20% by mass, based on said thermoplastic resin, of a pigment.

5. The image-receiving sheet for electrophotography of claim 1, wherein said thermoplastic resin is infiltrated to a depth of at least 2% of the thickness of said base paper from the surface thereof at the toner image-receiving layer side.

6. The image-receiving sheet for electrophotography of claim 1, wherein said thermoplastic resin is infiltrated to a depth of at least 5% of the thickness of said base paper from the surface thereof at the toner image-receiving layer side.

* * * * *